United States Patent
Harmon et al.

(10) Patent No.: US 11,912,237 B2
(45) Date of Patent: Feb. 27, 2024

(54) FRONT TRUNK INCLUDING MULTI-ACTION CLOSURE ASSEMBLY

(71) Applicant: Ford Global Technologies, LLC, Dearborn, MI (US)

(72) Inventors: Michael John Harmon, Northville, MI (US); Benjamin Howard, Grosse Pointe Park, MI (US); Kathryn N. Cezar, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 17/892,293

(22) Filed: Aug. 22, 2022

(65) Prior Publication Data

US 2023/0391269 A1 Dec. 7, 2023

Related U.S. Application Data

(60) Provisional application No. 63/347,704, filed on Jun. 1, 2022.

(51) Int. Cl.
*B60R 5/02* (2006.01)
*B62D 25/10* (2006.01)

(52) U.S. Cl.
CPC .............. *B60R 5/02* (2013.01); *B62D 25/105* (2013.01)

(58) Field of Classification Search
CPC .... B60R 5/02; B60R 5/04; B60R 9/06; B62D 25/087; B62D 25/10; B62D 25/105
USPC .................................. 296/24.45, 37.1, 37.6
See application file for complete search history.

(56) References Cited

U.S. PATENT DOCUMENTS

| | | | | |
|---|---|---|---|---|
| 4,413,854 | A * | 11/1983 | Hirshberg | B62D 25/105 296/37.16 |
| 8,020,912 | B2 * | 9/2011 | Lounds | B60J 5/103 296/76 |
| 10,272,748 | B2 | 4/2019 | Shin | |
| 10,480,239 | B1 * | 11/2019 | Wisneski | B62D 25/12 |
| 10,583,717 | B2 | 3/2020 | Hoggarth et al. | |
| 10,926,705 | B2 * | 2/2021 | Hoffman | B60R 5/02 |
| 11,454,060 | B2 * | 9/2022 | Rampalli | E05F 15/63 |
| 2003/0025350 | A1 | 2/2003 | Sande | |
| 2003/0218358 | A1 | 11/2003 | Hahn | |
| 2022/0355738 | A1 * | 11/2022 | Gill | B62D 25/087 |

OTHER PUBLICATIONS

Halvorson, B. (Nov. 16, 2021). 2022 Ford F-150 Lightning Electric Truck's frunk is more than the space left over. Green Car Reports. Retrieved Aug. 17, 2022, from https://www.greencarreports.com/news/1134181_2022-ford-f-150-lightning-electric-truck-frunk-more-than-the-space-left-over.

* cited by examiner

*Primary Examiner* — Jason S Daniels
(74) *Attorney, Agent, or Firm* — Vichit Chea; Carlson, Gaskey & Olds, P.C.

(57) ABSTRACT

A front trunk includes a multi-action closure assembly. In some aspects, the techniques described herein relate to a motor vehicle, including: a front trunk establishing a cargo space; a frame rotatably mounted relative to the cargo space; a first panel rotatably mounted to the frame; a second panel rotatably mounted to the frame; and wherein, when the first and second panels are in closed positions, the frame is rotatable to an open position to uncover the front trunk, wherein, when the frame is in a closed position, the first and second panels are rotatable to open positions to uncover the front trunk.

20 Claims, 5 Drawing Sheets

FRONT TRUNK INCLUDING MULTI-ACTION CLOSURE ASSEMBLY

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a front trunk including a multi-action closure assembly.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk establishing a cargo space; a frame rotatably mounted relative to the cargo space; a first panel rotatably mounted to the frame; a second panel rotatably mounted to the frame; and wherein, when the first and second panels are in closed positions, the frame is rotatable to an open position to uncover the front trunk, wherein, when the frame is in a closed position, the first and second panels are rotatable to open positions to uncover the front trunk.

In some aspects, the techniques described herein relate to a motor vehicle, wherein the first and second panels are only moveable to their respective open positions when the frame is in the closed position.

In some aspects, the techniques described herein relate to a motor vehicle, wherein the frame is configured to rotate relative to the cargo space about an axis adjacent a rear edge of the frame.

In some aspects, the techniques described herein relate to a motor vehicle, wherein the first panel is rotatably mounted to the frame adjacent a rear edge of the first panel.

In some aspects, the techniques described herein relate to a motor vehicle, wherein the second panel is rotatably mounted to the frame adjacent a bottom edge of the second panel.

In some aspects, the techniques described herein relate to a motor vehicle, wherein the second panel is rotatable independent of the first panel.

In some aspects, the techniques described herein relate to a motor vehicle, wherein: the first panel uncovers a top of the front trunk when the first panel is in the open position, and the second panel uncovers a front of the front trunk when the second panel is in the open position.

In some aspects, the techniques described herein relate to a motor vehicle, wherein the frame includes: first and second side components arranged on opposite sides of the cargo space and extending substantially parallel to a centerline of the motor vehicle; first and second vertical components projecting vertically from a respective one of the first and second side components; a first cross member connecting ends of the first and second side components; a second cross member connecting ends of the first and second vertical components, and wherein the first panel is rotatably mounted to the first cross member, wherein the second panel is rotatably mounted to the second cross member.

In some aspects, the techniques described herein relate to a motor vehicle, further including: a powered assembly configured to selectively move the frame, the first panel, and the second panel.

In some aspects, the techniques described herein relate to a motor vehicle, wherein the first panel provides a hood of the motor vehicle and the second panel provides a grille of the motor vehicle.

In some aspects, the techniques described herein relate to a motor vehicle, wherein the motor vehicle is a battery electric vehicle.

In some aspects, the techniques described herein relate to a method, including: uncovering a cargo space established by a front trunk of a motor vehicle by rotating a frame to an open position, wherein first and second panels are rotatably mounted to the frame.

In some aspects, the techniques described herein relate to a method, further including: uncovering the cargo space when the frame is in a closed position by rotating one or both of the first and second panels to a respective open position.

In some aspects, the techniques described herein relate to a method, wherein, when the frame rotates to the open position, the first and second panels are in a respective closed position.

In some aspects, the techniques described herein relate to a method, wherein the first and second panels are only moveable to their respective open positions when the frame is in the closed position.

In some aspects, the techniques described herein relate to a method, wherein: the frame is configured to rotate relative to the cargo space about an axis adjacent a rear edge of the frame, the first panel is rotatably mounted to the frame adjacent a rear edge of the first panel, and the second panel is rotatably mounted to the frame adjacent a bottom edge of the second panel.

In some aspects, the techniques described herein relate to a method, wherein the second panel is rotatable independent of the first panel.

In some aspects, the techniques described herein relate to a method, wherein: the first panel uncovers a top of the front trunk when the first panel is in the open position, and the second panel uncovers a front of the front trunk when the second panel is in the open position.

In some aspects, the techniques described herein relate to a method, wherein the frame, first panel, and second panel are movable by a powered assembly.

In some aspects, the techniques described herein relate to a method, wherein the first panel provides a hood of the motor vehicle and the second panel provides a grille of the motor vehicle.

DETAILED DESCRIPTION

This disclosure relates to a front trunk including a multi-action closure assembly. Among other benefits, which will be appreciated from the below description, the disclosed features increase the ease with which a user can load and unload the front trunk.

Figure 1:
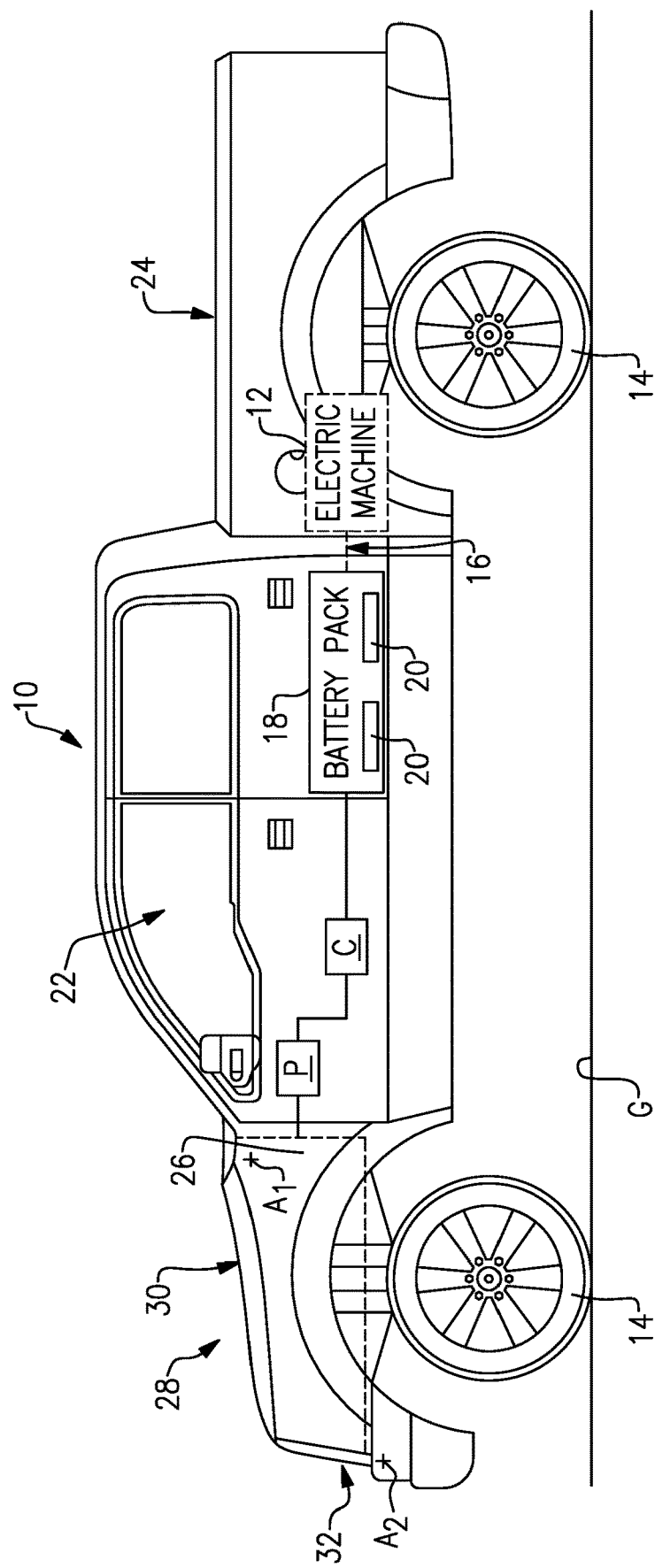
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 is a multi-action closure assembly configured to be selectively opened and closed in different ways.

The closure assembly 28 generally includes two independently moveable panels, namely a first panel 30 and a second panel 32, and a frame 33. The first and second panels 30, 32 and frame 33 are shown separate from the remainder of the vehicle 10 in FIG. 2 for ease of reference.

Figure 2:
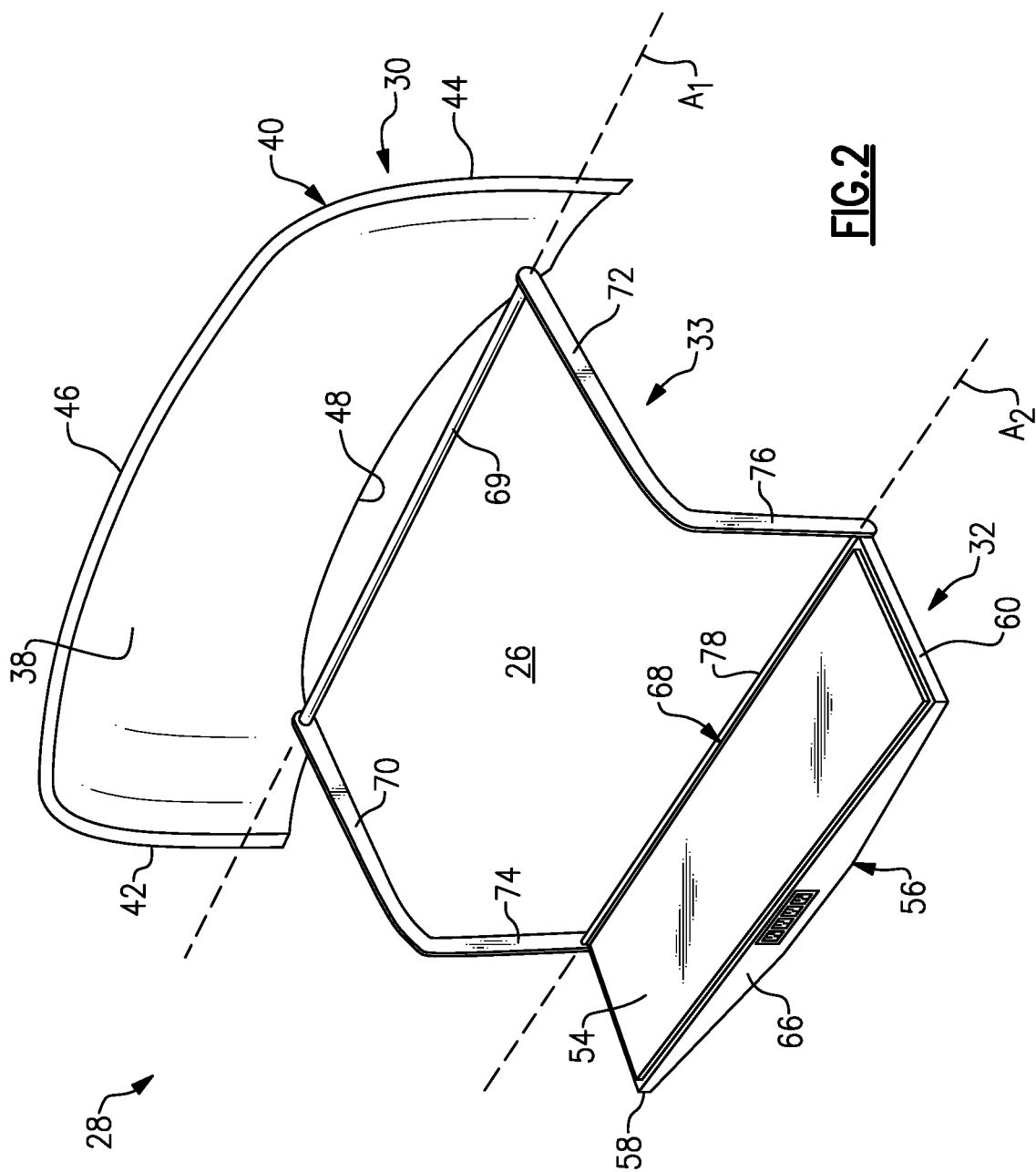
FIG. 2 illustrates certain components of a closure assembly of the front trunk of the electrified vehicle, namely a frame, a first panel, and a second panel.

In FIG. 2, the first and second panels 30, 32 are in respective open positions and the frame 33 is in a closed position. The respective positions of the first and second panels 30, 32 and the frame 33 will be described in more detail below. The general location of the front trunk 26 is labeled in FIG. 2 for reference. As shown, the frame 33 is generally disposed adjacent a perimeter of the front trunk 26 such that the frame 33 does not block access to the front trunk 26.

The first panel 30 includes first surface 38 and a second surface 40 opposite the first surface 38. The first surface 38 is the underside of the first panel 30. When the first panel 30 is closed, the first surface 38 faces the front trunk 26. The second surface 40 provides an exterior of the vehicle 10, and in particular provides a top of a hood in this example. The first panel 30 generally may be referred to as a hood or hood panel. When the first panel 30 is open, the first surface 38 may be referred to as a forward surface, and the second surface 40 may be referred to as a rear surface. The first and second surfaces 38, 40 extend laterally between opposed side edges 42, 44, and also extend between edges 46, 48. When the first panel 30 is closed, the edge 46 is a front edge and the edge 48 is a rear edge. When the first panel 30 is open, the edge 46 may be referred to as a top edge and the edge 48 may be referred to as a bottom edge.

Figure 3:
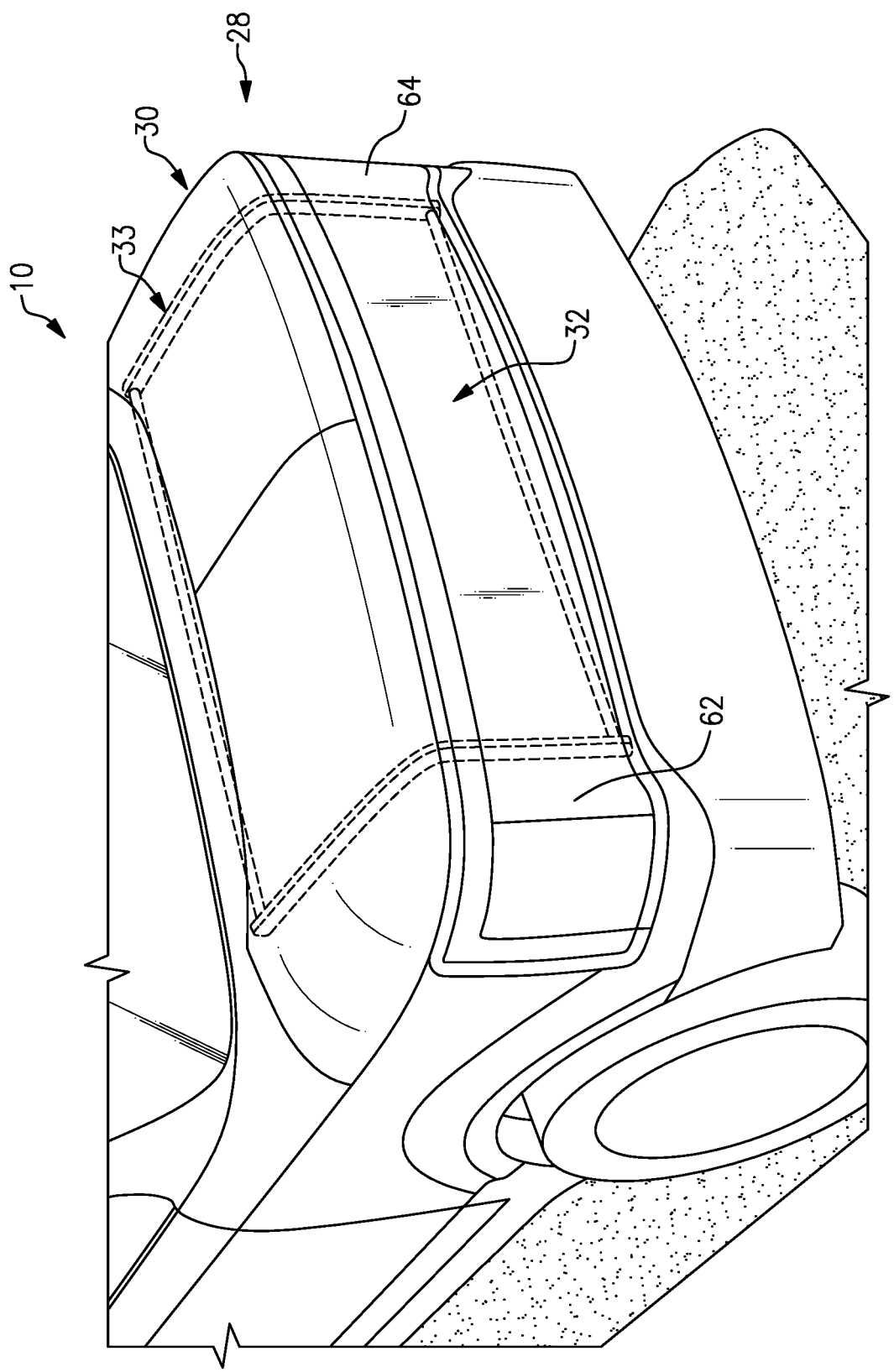
FIG. 3 illustrates the front trunk with the frame in a closed position, and the first and second panels in respective closed positions.

The second panel 32 includes first surface 54 and a second surface 56 opposite the first surface 54. When the second panel 32 is closed, the first surface 54 faces the front trunk 26. The second surface 56 provides an exterior of the vehicle 10, and in particular provides a grille in this example. The second panel 32 may be referred to as a grille or grille panel. When the second panel 32 is open, the first surface 54 may be referred to as a top surface, and the second surface 56 may be referred to as a bottom surface. The first and second surfaces 54, 56 extend laterally between opposed side edges 58, 60, which in this example fit between opposed headlamps 62, 64 (FIG. 3). The first and second surfaces 54, 56 also extend between edges 66, 68. When the second panel 32 is closed, the edge 66 is a top edge and the edge 68 is a bottom edge. When the second panel 32 is open, the edge 66 may be referred to as a front edge and the edge 68 may be referred to as a rear edge.

In this embodiment, the first panel 30 does not include a component extending vertically-downward from the first surface 38 adjacent the edge 46. In other words, the first panel does not provide any portion of the grille of the vehicle 10. In other examples, the first panel could provide a portion of the grille of the vehicle 10, however.

The second panel 32 may be sized and shaped to match a grille in an engine-driven model of a vehicle, such as a pickup truck, in order to maintain the same look and allow for essentially the same front end vehicle body structure across a vehicle lineup. While the second panel 32 may be configured to look the same as engine-driven vehicles, the second panel 32 exhibits solid surfaces configured to keep water out of the front trunk 26. In this example, the solid surfaces are feasible in the vehicle 10 because no air flow is needed for engine cooling.

Figure 5:
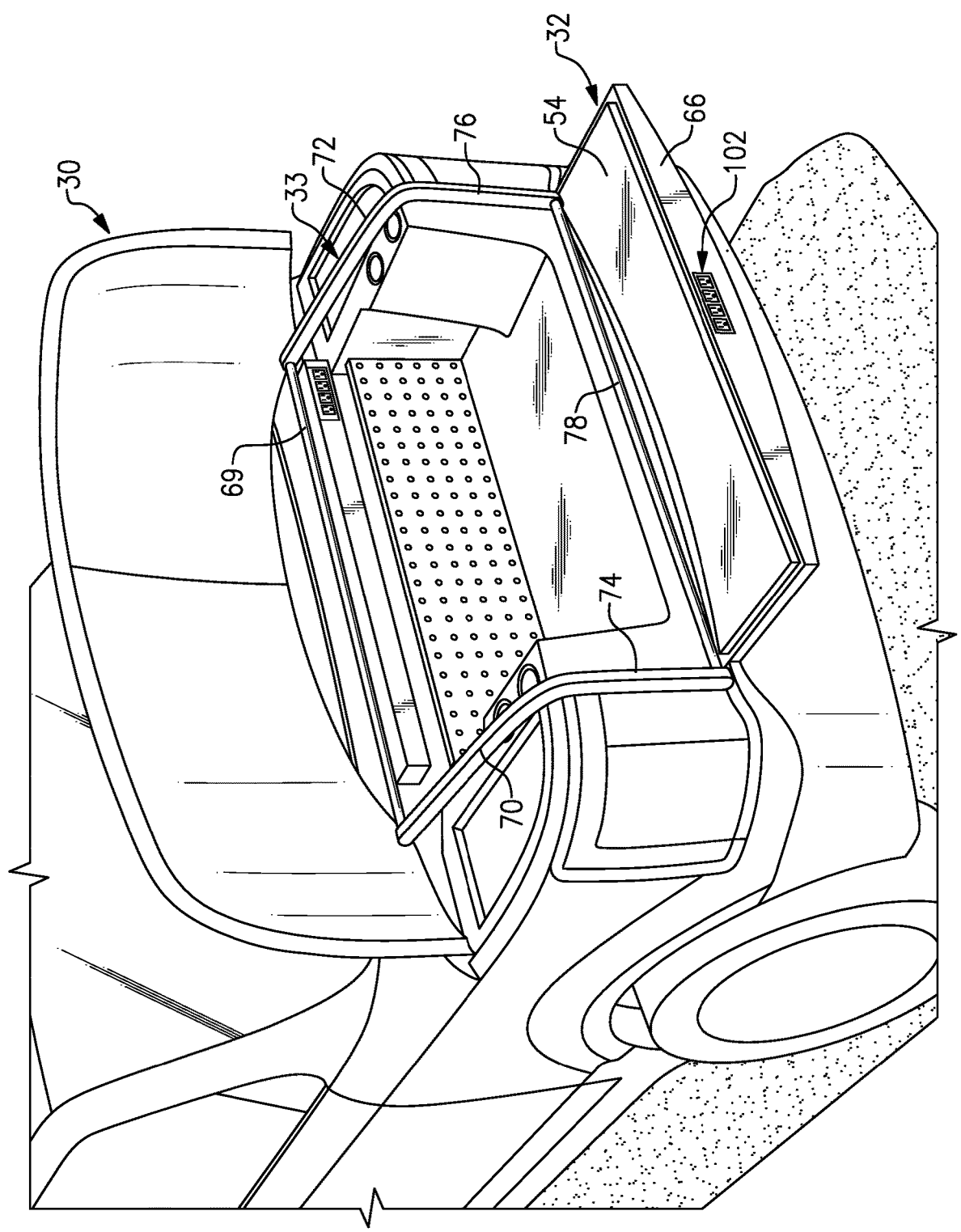
FIG. 5 illustrates the front trunk with the frame in a closed position, and the first and second panels in respective open positions.

The frame 33 is an assembly that includes a plurality of components, some of which will be discussed below. As shown in FIG. 2 and FIG. 5, the frame 33 includes a first cross member 69 which extends perpendicular to a centerline of the vehicle 10 and is located adjacent a top and a rear of the front trunk 26. The frame further includes first and second side components 70, 72 arranged generally on opposite sides of the front trunk 26 and on opposite sides of a centerline of the vehicle 10. In this example, the rear ends of the first and second side components 70, 72 are attached to the first cross member 69, and the first and second side components 70, 72 project from the first cross member 69 in directions substantially parallel to the centerline of the vehicle 10. The first and second side components 70, 72 extend forward from the first cross member 69 to first and second vertical components 74, 76. The first and second vertical components 74, 76 extend vertically downward, with respect to FIG. 2, from the first and second side components 70, 72 to a second member 78. The second cross member 78 connects bottom ends of the first and second vertical components 74, 76 by extending between the bottom ends of the first and second vertical components 74, 76 across the centerline of the vehicle 10. The first and second side components 70, 72, first and second vertical components 74, 76, and the first and second cross members 69, 78 may be formed of a single piece or multiple pieces of a metallic material, such as aluminum (Al). While aluminum is mentioned, this disclosure extends to components made of other materials, however.

In this disclosure, the first and second panels 30, 32 are moveable relative to the frame 33 when the frame 33 is in the closed position to selectively uncover the front trunk 26. Further, the first and second panels 30, 32 are moveable with the frame 33 to selectively uncover the front trunk 26. In this way, the closure assembly 28 can selectively cover and uncover the front trunk 26 using multiple actions and combinations of movements of the first and second panels 30, 32 and the frame 33. A user can open or close the closure assembly 28 in a desired manner, as dictated by a preference of the user and/or as beneficial to a particular task being performed by the user.

In this disclosure, the first panel 30 is rotatably mounted to the frame 33 about axis $A_1$. Specifically, the first panel 30 is configured rotate between a closed position (FIGS. 1, 3, and 4) and an open position (FIGS. 2 and 5) about the axis $A_1$, which is adjacent the edge 48 of the first panel 30. In an example, the first panel 30 is rotatably mounted to the first cross member 69 via one or more hinges, such as barrel hinges, or another type of hinge or linkage. The first cross member 69 is disposed about the axis $A_1$, in an example. In one specific example, the first panel 30 rotates substantially 90° between the open and closed positions.

The second panel 32 is rotatably mounted to the frame 33 about axis $A_2$, which is adjacent the edge 68. Specifically, the second panel 30 is configured rotate between a closed position (FIGS. 1, 3, and 4) and an open position (FIGS. 2 and 5) about the axis $A_2$. The second cross member 78 is disposed about the axis $A_2$ in this example. The second panel 32 is rotatably mounted to the second cross member 78 via one or more hinges, such as barrel hinges, or another type of hinge or linkage, in an example. In one specific example, the second panel 32 rotates substantially 90° between the open and closed positions.

The frame 33 is rotatably mounted to a body of the vehicle 10, and is rotatable relative to a cargo space established by the front trunk 26 about the axis $A_1$. In another example, the frame 33 is rotatably mounted to the body of the vehicle 10 about an axis spaced-apart from, but adjacent to, the axis $A_1$. The frame 33 may be connected to the body of the vehicle via one or more hinges, including barrel hinges, strand hinges, etc. In a particular example, the frame 33 is connected to the body of the vehicle 10 by strand hinges, in which one of the strands is curved, or by another type of hinge or linkage. In an example, the frame rotates substantially 90° between the open (FIG. 4) and closed (FIGS. 1-3 and 5) positions.

When the frame 33 is in the closed position (FIGS. 1-3 and 5), the front trunk 26 may be conveniently accessed through either the first panel 30, the second panel 32, or both. In particular, the first panel 30 is rotatable about a first axis $A_1$ to selectively cover and uncover the front trunk 26 from above. The second panel 32, in this example, is rotatable about a second axis $A_2$ adjacent a bottom of the second panel 32 to selectively cover and uncover the front trunk 26 from the front.

FIGS. 2 and 5 illustrate the first and second panels 30, 32 in their respective open positions. When moving to their respective open positions, the first and second panels 30, 32 move in generally opposite directions in this example. In particular, with reference to FIG. 2, the first panel 30 has rotated rearwardly and upwardly about axis $A_1$ relative to the closed position of FIG. 1, while the second panel 32 has rotated forwardly and downwardly about axis $A_2$ relative to the closed position of FIG. 1. With both the first and second panels 30, 32 in their respective open positions, the front trunk 26 is accessible from above and from the front. Axes $A_1$, $A_2$ are parallel to one another and perpendicular to a centerline of the vehicle 10 in this example. The locations of the axes $A_1$, $A_2$ are representative. Other locations for the axes $A_1$, $A_2$ come within the scope of this disclosure.

Figure 4:
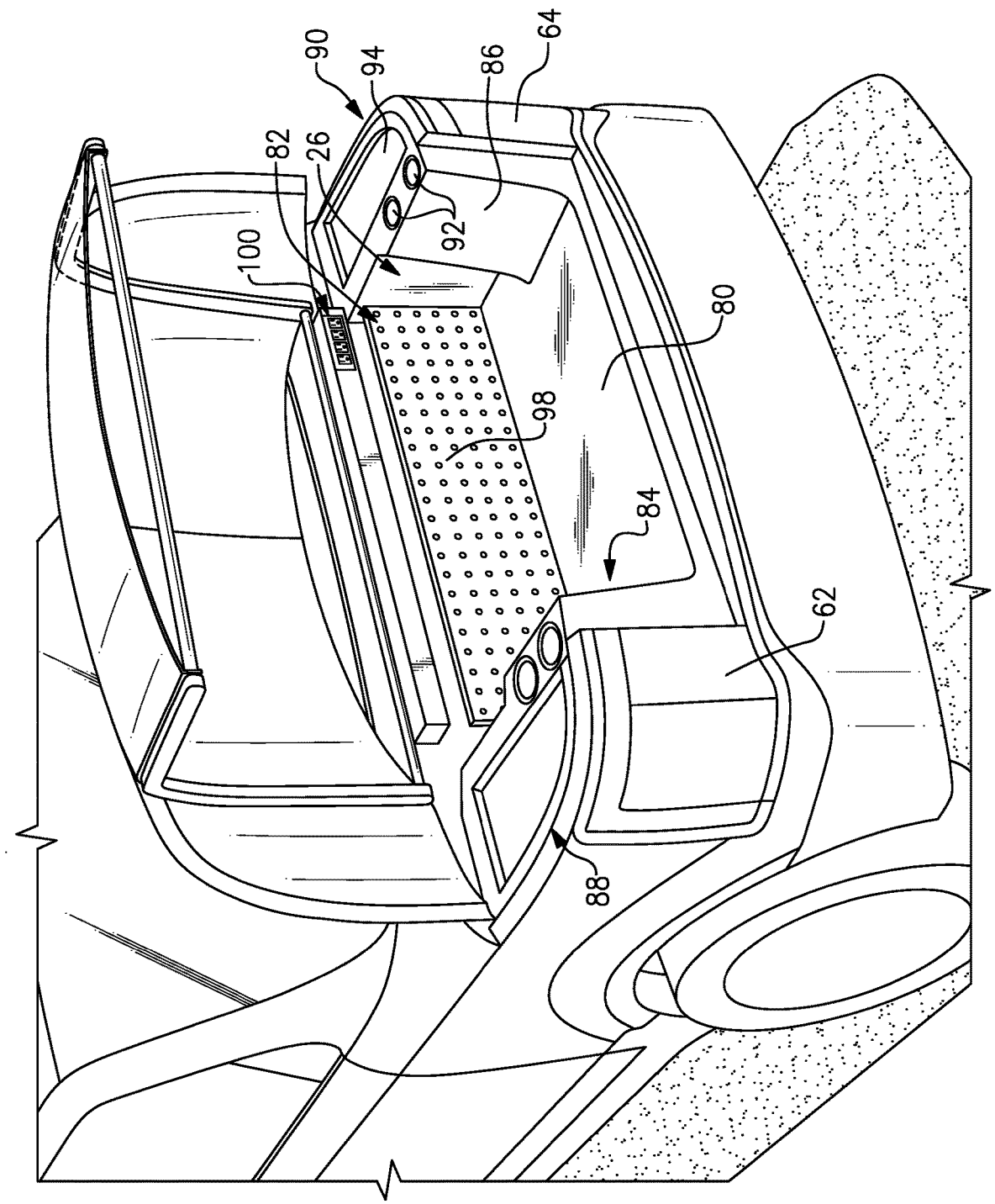
FIG. 4 illustrates the front trunk with the frame in an open position.

When the first and second panels 30, 32 are in their respective closed positions (FIGS. 1, 3, and 4), the frame 33 is rotatable from its closed position (FIGS. 1-3 and 5) to an open position (FIG. 4). The first and second panels 30, 32 do not move relative to the frame 33 as the frame 33 rotates to the open position, in this example. When the frame 33 is open, the first and second panels 30, 32 are in a substantially similar position relative to the frame 33 as in the closed positions of FIGS. 1 and 3. Thus, when the frame 33 is open, the first and second panels 30, 32 may be deemed in a closed position despite the front trunk 26 not being covered due to the rotation of the frame 33 to its open position. Regardless, in this way, the front trunk 26 can be fully uncovered by a single movement of the frame 33, which may be desired by some users and/or more convenient for certain tasks.

In an embodiment, the first and second panels 30, 32 and the frame 33 are manually moveable between their respective open and closed positions. However, the first and second panels 30, 32 and frame 33 could be opened automatically by a powered assembly P (FIG. 1) in this example. The powered assembly P can include one or more powered actuators, gears, and/or linkages configured to move the closure assembly 28 automatically and without requiring a user to apply force to move the closure assembly 28. The powered assembly P includes a mechanical connection permitting the powered assembly P to rotate the first panel about axis $A_1$, the second panel about axis $A_2$, and the frame 33 about axis $A_1$.

A user could initiate a specific command to open or close of the closure assembly 28 by initiating an open or close command on a keyfob, on mobile device of the user, by a button on an exterior of the vehicle 10, and/or by a user interface in the passenger cabin 22. The command could include a command to open/close either the first or second panel 30, 32; simultaneously open/close both the first and second panels 30, 32; or to open/close the frame 33. Regarding the latter command, if the user wishes to move the frame 33 to the open position but either the first or second panels 30, 32 are in a respective open position, the powered assembly P would first move the first and second panels 30, 32 to their respective closed positions before moving the frame 33 to the open position, in an example.

The actuator(s) of the powered assembly P can hold the closure assembly 28 in the open and closed positions. Alternatively or additionally, the various hinges discussed above relative to the first panel 30, second panels 32, and frame 33 may cooperate with one or more detents and/or releasable latches configured to hold the first panel 30, second panels 32, and frame 33 in various the open and closed positions.

When the first and second panels 30, 32 and frame 33 are closed, the various edges/surfaces of the first and second panels 30, 32 and the body of the vehicle 10 are configured to fit relative to one another to enclose the front trunk 26 and seal the front trunk 26 relative to the outside environment. In particular, the various edges/surfaces either abut one another directly or indirectly via a seal or gasket, as examples.

In one aspect of this disclosure, the first and second panels 30, 32 are connectable by a releasable latch between first surface 38 and edge 66. Further, the second panel 32 is connectable to a body of the vehicle 10 via a releasable latch adjacent the edge 68. The releasable latches can include a latch configured to engage a corresponding projection. One or more other latches may also hold frame 33 in the closed position. Before the first and second panels 30, 32 are moved to their respective open positions, a latch, if present, between the first surface 38 and edge 66 is released. Further, before the frame 33 is moved to its open position, a latch, if present, between the edge 68 and the body of the vehicle 10 is released. The latches discussed above, if present, are selectively engageable and releasable by the powered assembly P. Alternatively, the latches may be manually releasable.

Further, the vehicle 10 can include a controller C (FIG. 1) that is part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. As examples, the controller C can selectively command the powered assembly P (if present) to open and close the first and second panels 30, 32 and frame 33, among other functions.

The front trunk 26 includes a number of additional features that, in combination with the closure assembly 28 and in particular the configuration of the first panel 30, second panel 32, and frame 33, increase the usability of the front trunk 26. With reference to FIG. 4, the front trunk 26 includes a floor 80, a rear wall 82, and opposed lateral side walls 84, 86, which provide boundaries of a front cargo space of the vehicle 10. Various items can rest on the floor 80, and various other items such as tools and chargers can be attached to the rear wall 82 in this example.

Laterally outward of the side walls 84, 86, side ledges 88, 90 are accessible and usable when the first panel 30 is open. The side ledges 88, 90 extend laterally from an upper portion of a respective one of the side walls 84, 86 to an exterior side of the vehicle 10, and otherwise generally exhibit a similar contour to the first panel 30 such that when the first panel 30 is closed, the first panel 30 overlaps and covers the side ledges 88, 90. In an example, the first panel 30 directly abuts the side ledges 88, 90 when the first panel 30 is closed. The side ledges 88, 90 are configured as useable spaces when the first panel 30 is open. With reference to side ledge 90, the side ledge 90 includes two cup holders 92 and a work surface 94. The side ledge 88 is configured similarly, but reflected about the centerline of the vehicle 10. The work surface 94 is substantially parallel to the floor 80 of the front trunk 26. The work surface 94 may be formed as a textured or finished surface configured to resist sliding of items places on the work surface 94. In this regard, the work surface 94 may be considered a storage tray. The work surface 94 could alternatively be configured to receive a rubber mat. The work surface 94 could alternatively or additionally be configured to include or receive a wireless charging pad configured to charge computing devices or mobile devices.

The rear wall 82 includes a section including perforated hardboard 98. Various items, such as tools and chargers, may be mounted to the perforated hardboard 98. The chargers could be connected to a power source of the vehicle 10. The perforated hardboard 98 can be used for the storage of tools and equipment, as examples. Further, the perforated hardboard 98 can be mounted to the rear wall 82 or, alternatively, the rear wall 82 can be integrally formed with equally-spaced holes corresponding to those of perforated hardboard. The perforated hardboard 98 includes equally-spaced apart holes configured to receive standard sized pegs, hooks, or other adapters configured to mount and store various items.

The front trunk 26 may include various power outlets. In an example, four 120 Volt power outlets 100 are shown in the rear wall 82 above the perforated hardboard 98. While four 120 Volt power outlets are shown, there could include a different number or type of power outlets, including 240 Volt power outlets, USB-C outlets, etc. In addition to power outlets 100, the second panel 32 also includes power outlets 102 (FIG. 5) in the edge 66, in this example. Further, in this regard, when the second panel 32 is in the open position, the first surface 54 is substantially parallel to a ground surface G, which may be dirt, pavement, concrete, etc., and may function as a tabletop or work space and could be used as a desk, a picnic table, a tailgating area, etc. The power outlets 100, 102 can conveniently charge items such as tools, computing devices, or mobile devices that are being used adjacent the front trunk 26, such as on or adjacent the rear wall 82 or the first surface 54. As with the power outlets 100, the power outlets 102 could vary in type and/or amount. While two power outlet locations have been discussed, the front trunk 26 could include power outlets in additional locations.

The first surface 54 can be formed as a textured or finished surface configured to resist sliding of items places on the first surface 54. A rubber mat could be attached to or placed on the first surface 54. The first surface 54 could also include or incorporate a wireless charging pad.

Further, the first surface 38 could include or be formed with a section of perforated hardboard, similar to perforated hardboard 98. The first surface 38 could also include a mount for storage or display of various items.

In both embodiments, the various surfaces of the front trunk 26 and first and second panels 30, 32 may be made of a polymeric material. However, other materials, including metallic materials, are also contemplated within the scope of this disclosure.

The various work surfaces discussed above, including the surfaces 54, 94, could include one or more embossings that establish one or more measurement rulers for measuring items when positioned atop the work surface. Each of the work surfaces may include cup holders, storage trays, power outlets, etc. The front trunk 26 could also be fitted with various storage compartments and other features such as speakers for listening to music or other audio during tailgating, work, or other activities, and an interface for controlling the speakers. Any electronics, including power outlets, can be electrically connected to and powered by the battery pack 18.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a front trunk establishing a cargo space;
a frame rotatably mounted relative to the cargo space;
a first panel rotatably mounted to the frame;
a second panel rotatably mounted to the frame; and
wherein, when the first and second panels are in closed positions, the frame is rotatable to an open position to uncover the front trunk,
wherein, when the frame is in a closed position, the first and second panels are rotatable to open positions to uncover the front trunk.

2. The motor vehicle as recited in claim 1, wherein the first and second panels are only moveable to their respective open positions when the frame is in the closed position.

3. The motor vehicle as recited in claim 1, wherein the frame is configured to rotate relative to the cargo space about an axis adjacent a rear edge of the frame.

4. The motor vehicle as recited in claim 2, wherein the first panel is rotatably mounted to the frame adjacent a rear edge of the first panel.

5. The motor vehicle as recited in claim 3, wherein the second panel is rotatably mounted to the frame adjacent a bottom edge of the second panel.

6. The motor vehicle as recited in claim 4, wherein the second panel is rotatable independent of the first panel.

7. The motor vehicle as recited in claim 5, wherein:
the first panel uncovers a top of the front trunk when the first panel is in the open position, and
the second panel uncovers a front of the front trunk when the second panel is in the open position.

8. The motor vehicle as recited in claim 1, wherein the frame comprises:
first and second side components arranged on opposite sides of the cargo space and extending substantially parallel to a centerline of the motor vehicle;
first and second vertical components projecting vertically from a respective one of the first and second side components;
a first cross member connecting ends of the first and second side components;
a second cross member connecting ends of the first and second vertical components, and
wherein the first panel is rotatably mounted to the first cross member,
wherein the second panel is rotatably mounted to the second cross member.

9. The motor vehicle as recited in claim 1, further comprising:
a powered assembly configured to selectively move the frame, the first panel, and the second panel.

10. The motor vehicle as recited in claim 1, wherein the first panel provides a hood of the motor vehicle and the second panel provides a grille of the motor vehicle.

11. The motor vehicle as recited in claim 1, wherein the motor vehicle is a battery electric vehicle.

12. A method, comprising:
uncovering a cargo space established by a front trunk of a motor vehicle by rotating a frame to an open position, wherein first and second panels are rotatably mounted to the frame.

13. The method as recited in claim 12, further comprising:
uncovering the cargo space when the frame is in a closed position by rotating one or both of the first and second panels to a respective open position.

14. The method as recited in claim 13, wherein, when the frame rotates to the open position, the first and second panels are in a respective closed position.

15. The method as recited in claim 13, wherein the first and second panels are only moveable to their respective open positions when the frame is in the closed position.

16. The method as recited in claim 13, wherein:
the frame is configured to rotate relative to the cargo space about an axis adjacent a rear edge of the frame,
the first panel is rotatably mounted to the frame adjacent a rear edge of the first panel, and
the second panel is rotatably mounted to the frame adjacent a bottom edge of the second panel.

17. The method as recited in claim 16, wherein the second panel is rotatable independent of the first panel.

18. The method as recited in claim 17, wherein:
the first panel uncovers a top of the front trunk when the first panel is in the open position, and
the second panel uncovers a front of the front trunk when the second panel is in the open position.

19. The method as recited in claim 13, wherein the frame, first panel, and second panel are movable by a powered assembly.

20. The method as recited in claim 12, wherein the first panel provides a hood of the motor vehicle and the second panel provides a grille of the motor vehicle.

* * * * *